Oct. 15, 1968           A. W. STEWART            3,405,867
            TIME INTERVAL MEASURING AND RECORDING DEVICE
Filed Oct. 21, 1965                        8 Sheets-Sheet 1

FIG.1

INVENTOR
ALFRED W. STEWART

Oct. 15, 1968 A. W. STEWART 3,405,867
TIME INTERVAL MEASURING AND RECORDING DEVICE
Filed Oct. 21, 1965
8 Sheets-Sheet 3

INVENTOR
ALFRED W. STEWART
BY

ATTORNEY

Oct. 15, 1968     A. W. STEWART     3,405,867
TIME INTERVAL MEASURING AND RECORDING DEVICE
Filed Oct. 21, 1965     8 Sheets-Sheet 4

INVENTOR
ALFRED W. STEWART
BY

ATTORNEY

Oct. 15, 1968 A. W. STEWART 3,405,867
TIME INTERVAL MEASURING AND RECORDING DEVICE
Filed Oct. 21, 1965
8 Sheets-Sheet 5

INVENTOR
ALFRED W. STEWART
BY

ATTORNEY

FIG.12

Oct. 15, 1968 A. W. STEWART 3,405,867
TIME INTERVAL MEASURING AND RECORDING DEVICE
Filed Oct. 21, 1965 8 Sheets-Sheet 7

FIG. 13A

INVENTOR
ALFRED W. STEWART
BY

ATTORNEY

United States Patent Office 3,405,867
Patented Oct. 15, 1968

3,405,867
TIME INTERVAL MEASURING AND
RECORDING DEVICE
Alfred W. Stewart, Mountain Lakes, N.J., assignor to
Datron Systems, Inc., Mountain Lakes, N.J., a corporation of New Jersey
Filed Oct. 21, 1965, Ser. No. 499,379
15 Claims. (Cl. 234—58)

ABSTRACT OF THE DISCLOSURE

A time clock punch for recording the start and termination of intervals on tabulating cards by punching indicia therein utilizing a plurality of punch solenoids so that one punch solenoid is utilized for each punch allowing for multiple punching up to the maximum number of holes per column. Spacing means are provided for moving the tabulating card to present a different zone to the recording means or punches in accordance with a control signal.

---

This invention relates generally to a time interval measuring device and means for recording the start and the termination of the interval. More specifically, the invention relates to a clock device for measurement of timed intervals and mechanism for applying indicia representative thereof upon an indicia bearing member, such as a standard tabulating card, upon command.

The invention is described herein in terms of a time clock punch for recording the start and termination of intervals on tabulating cards by punching indicia therein. The invention, however, is not limited to this specific embodiment and can readily be applied to the use of other interval measuring devices and the application of information in other forms to other types of indicia bearing members.

It is an object of this invention to provide a time interval measuring and recording device having means for applying indicia to a card employing a plurality of punch solenoids so that one punch solenoid is utilized for each punch allowing for multiple punching up to the maximum number of holes per column with the same mechanical stress as would be utilized with one hole, wherein each solenoid does a fraction of the work, eliminates complicated linkages and interposes, allows for smaller solenoids, and saves space and weight.

A further object of the invention is to provide in such a device a unique manner of positioning a card.

It is a further object of the invention to provide a system for measuring and recording wherein higher punching speeds can be utilized due to the elimination of interposers.

It is a further object of the invention to provide in such a system a positive feed mechanism for moving a card one space at a time and for employing a system wherein punching and the application of indicia can be initially made at any position on the card.

It is still a further object of the invention to provide in a time interval measuring and recording device an electrical system utilizing structure and means for converting sequential time pulses to a non-decimal readout.

A time interval measuring and recording device embodying the invention and the manner of using the same is described herein with references to the drawings, in which.

Figure 1:
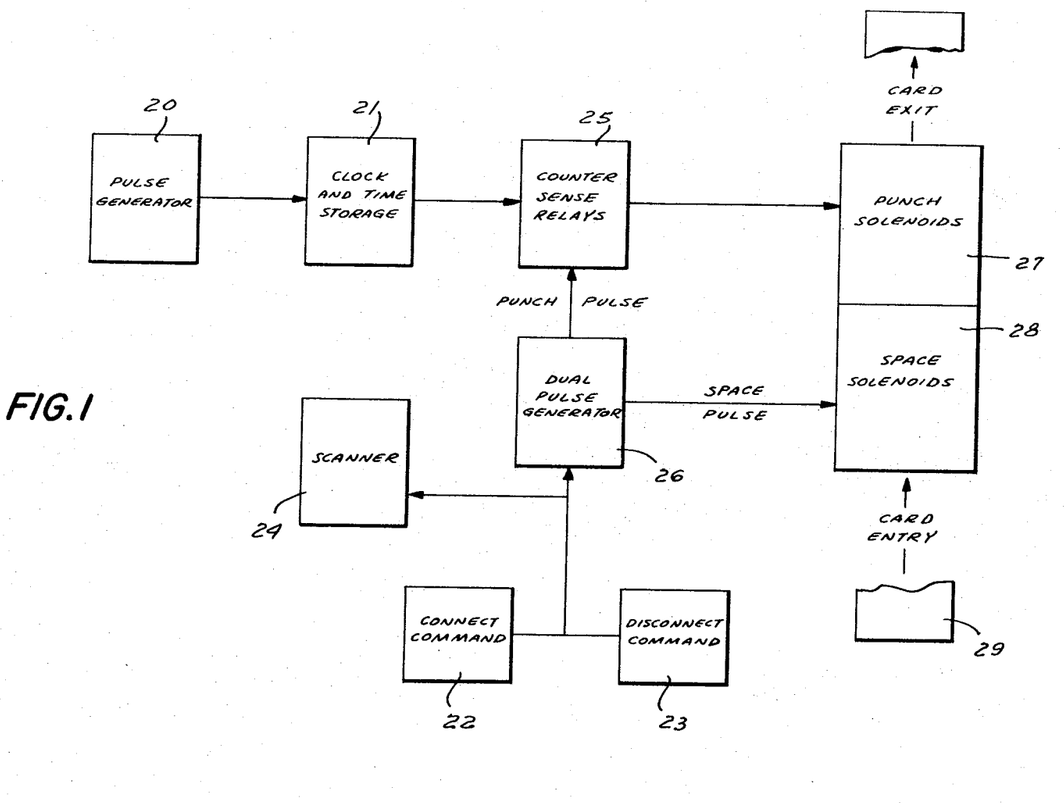
FIG. 1 is a diagrammatic representation of a time interval measuring and recording device constructed in accordance with the teachings of this invention.
Figure 2:
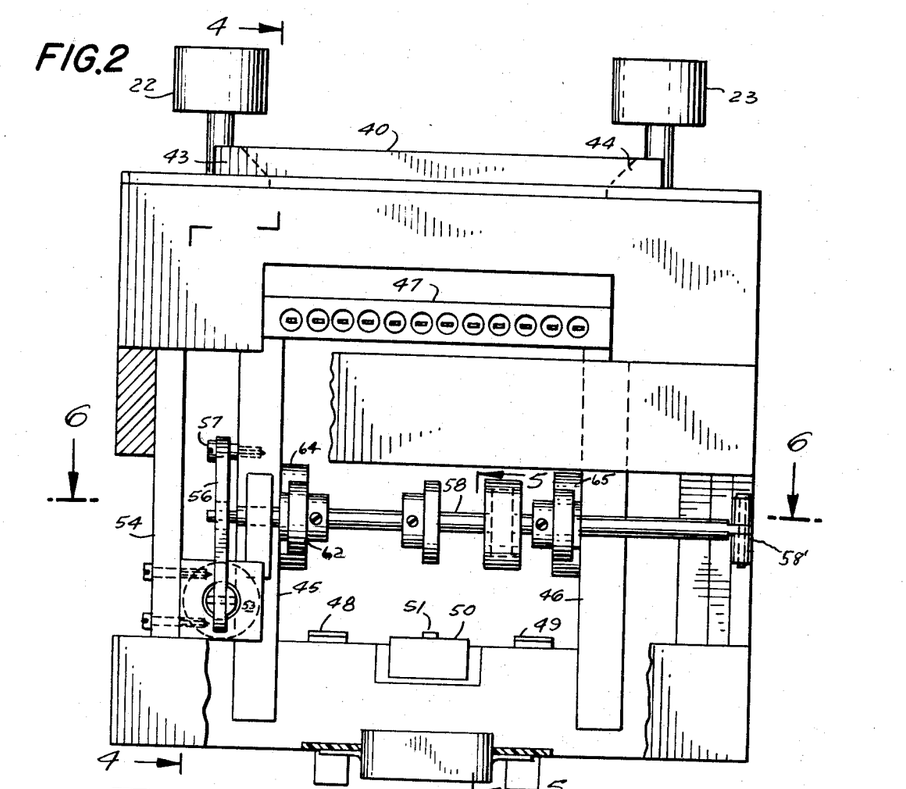
FIG. 2 is a segmentary view from above of the card handling section of the time interval measuring and recording device illustrated in FIG. 1.

In FIG. 1 a diagrammatic representation of the embodiment of the invention disclosed herein is shown. In this figure pulse generator 20 which is referred to as a "time" pulse generator provides a pulse at regular intervals of every six seconds to clock unit 21 which stores the pulses and displays time in hours, minutes and tenths of minutes, although other desired units of time measurement may be employed.

Two command means are provided. Command means 22 is referred to as "connect" command, and command means 23 is referred to as "disconnect" command. Scanner 24, upon receiving either a "connect" or "disconnect" command, scans the counter sense relays 25 which are representative of the information stored in clock 21.

The "connect" or "disconnect" command also actuates a second pulse generator 26 which is referred to herein as a "dual" pulse generator and which emits alternate pulses. These alternate pulses are identified herein respectively as space and punch pulses. The punch puluses pass through certain of the punch relays 25, namely those which have been conditioned by clock 21, to energize punch solenoids 27, actuating the corresponding punch solenoids which drive punches through card 29 representative of the information stored in clock 21. The space pulse from generator 26 which follows each punch pulse is applied directly to another solenoid 28 which is referred to as the space solenoid and which causes card 29 to move a distance the equivalent of one column of the card.

The device as disclosed in this embodiment is provided with a card handling section which includes the punch and space solenoids, the punch and spacing mechanism and the command means. The remaining portions of the device, including the pulse generators, storage, etc., are provided in a separate clock-control section which may be remotely located if desired. The provision of the two sections is a matter of choice and all of the components may be included in a single unit or further separated as desired.

Figure 10:
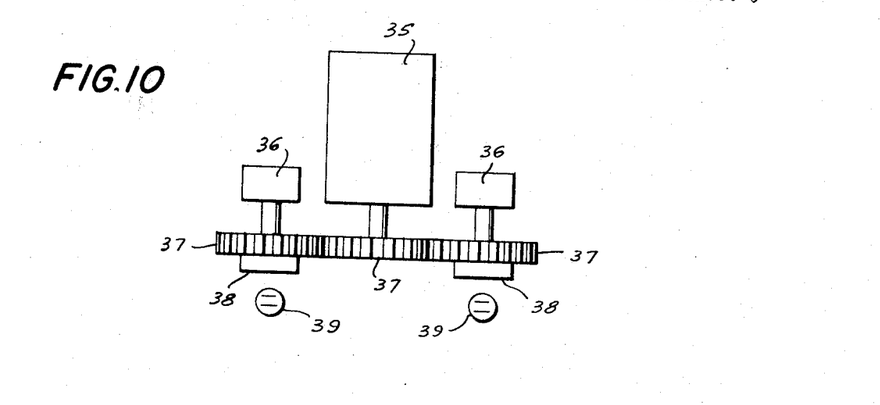
FIGS. 10 and 11 are views of one form of dual pulse generator for use in the device.
Figure 11:
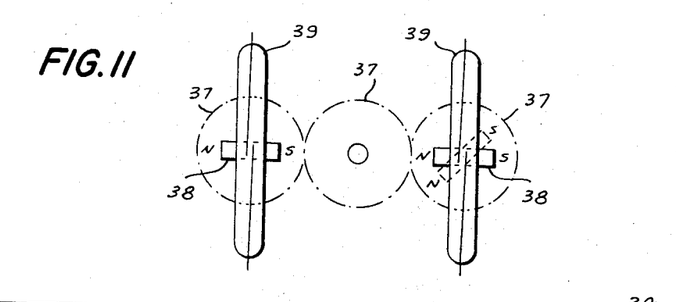
Figure 12:
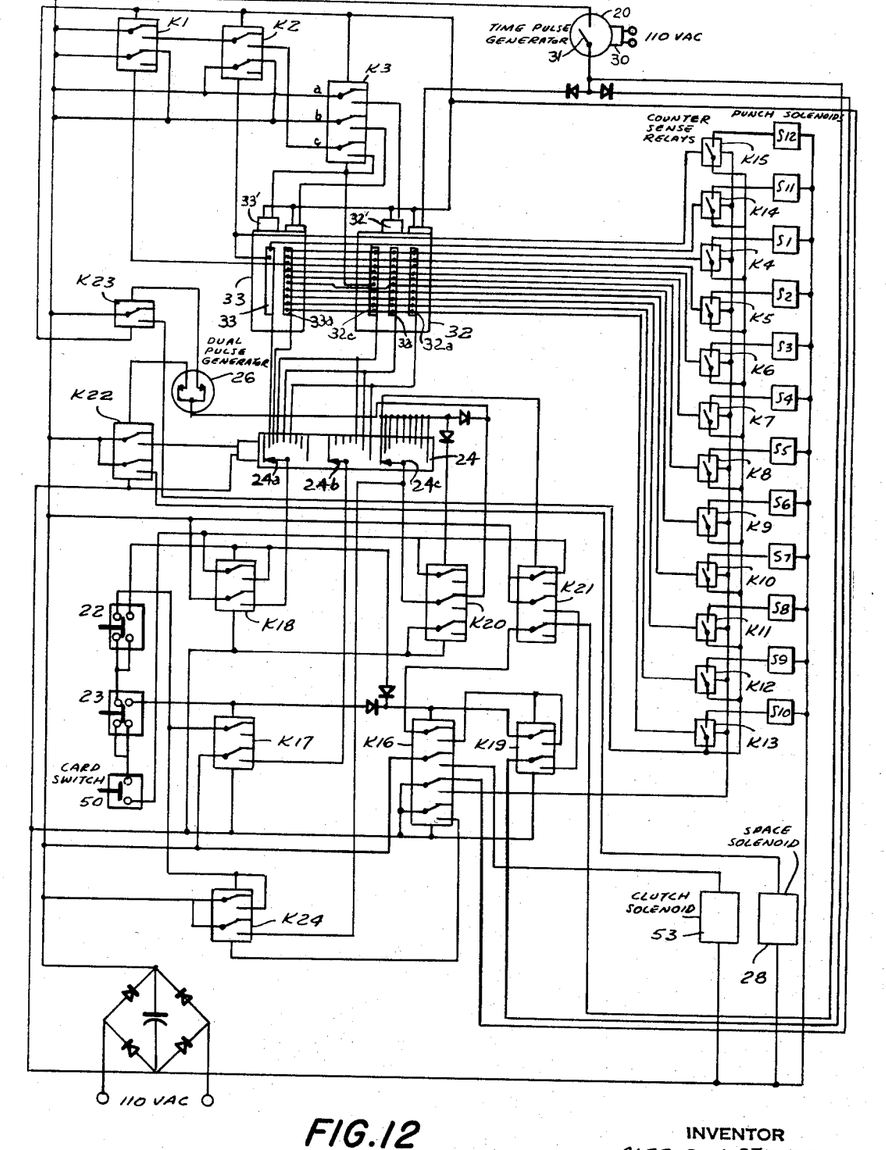
FIG. 12 is a wiring diagram of the circuitry used in the time interval measuring and recording device shown in FIG. 1.
Figure 13A:
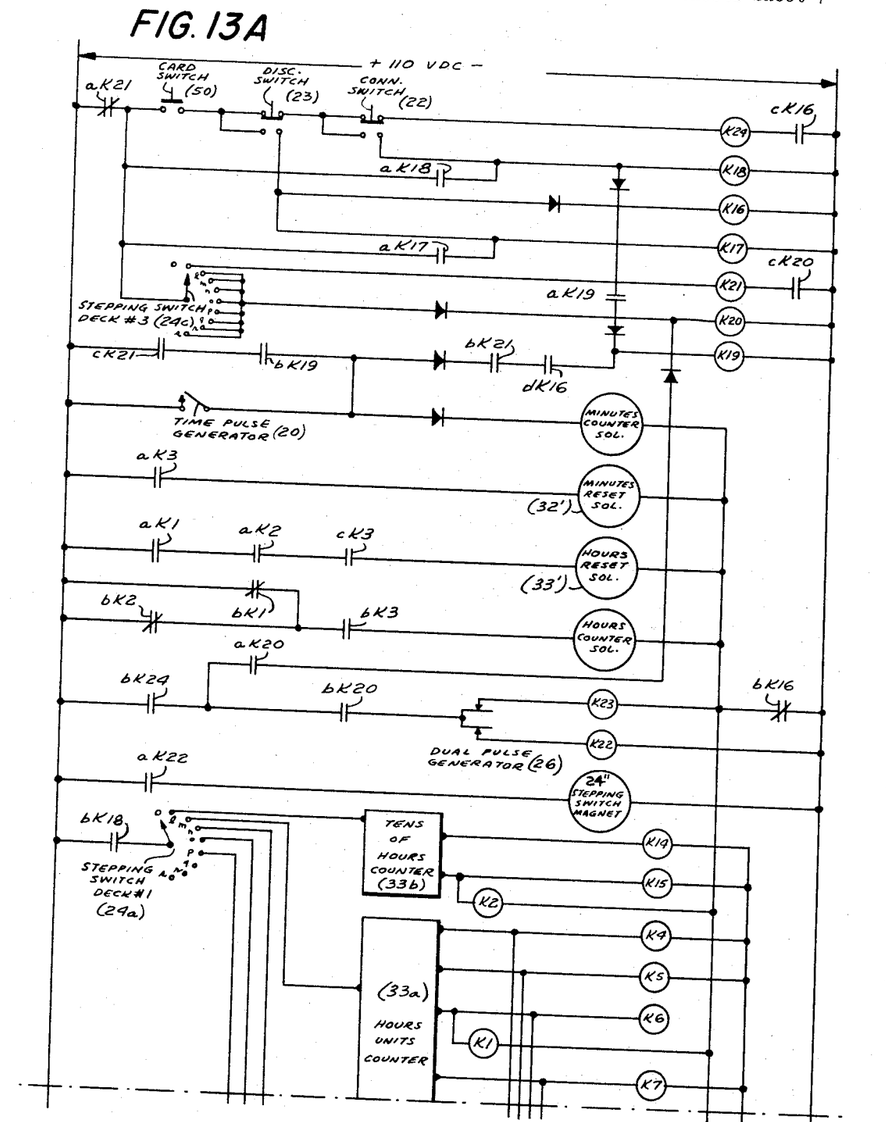
FIGS. 13A and 13B together comprise a schematic view of the electrical circuitry shown in FIG. 12.
Figure 13B:
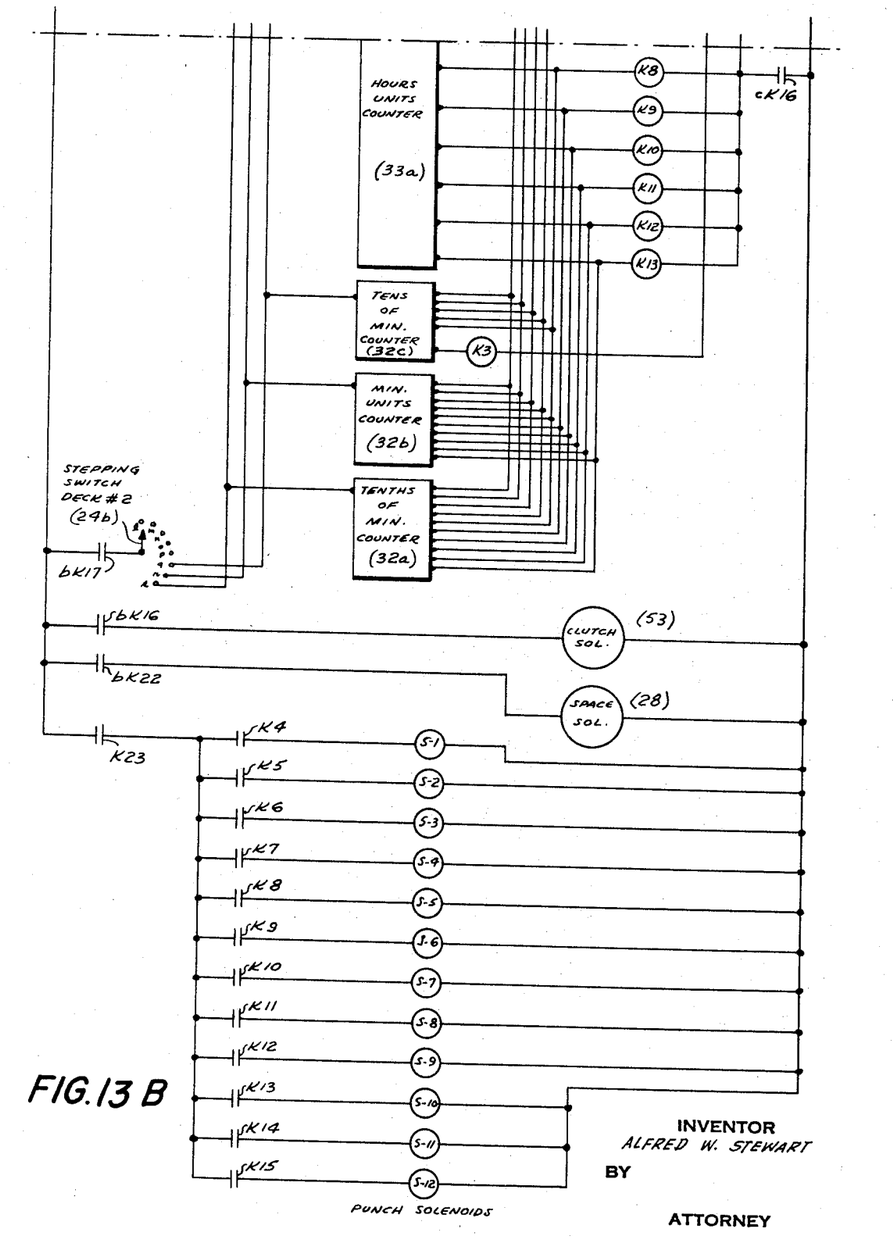

In the description which follows, FIGS. 1, 12 and 13 are useful in understanding the complete device as a system, FIGS. 10 and 11 show the dual pulse generator 26 which is located in the clock-control section, and FIGS. 2–9 disclose portions of the card handling section of the device. Pulse generator 20 includes a 10 r.p.m. synchronous motor 30 which causes the contacts of switch 31 to be closed (for the correct duration) of every revolution.

The storage portion of clock 21 includes electrical readout decade counters 32 and 33. These decade counters are of a type which is commercially available and which is well known in the art, having indicating wheels with each wheel having a corresponding row of terminals (one for each position and a common terminal). Each counter has a reset solenoid which will reset all wheels to 0 in that counter when the reset solenoid is pulsed. In the figures the reset solenoid of counter 32 is indicated by the numeral 32' and the reset solenoid for the counter 33 is indicated by the numeral 33'.

When time pulse generator 20 is operating pulses are applied to counter 32 and the first wheel, 32a, in counter 32 is pulsed once every six seconds or ten times every minute. The second wheel is indicated by the numeral 32b and it is turned one position by mechanical interlock whenever wheel 32a moves from the 9 position to the 0 position resulting in an advance of wheel 32b one position every minute. Wheel 32a continues to advance one position every six seconds causing wheel 32b to advance once for every ten position change of wheel 32a. Likewise, for every ten position changes of wheel 32b (10 minutes) wheel 32c representing "10's of minutes" will be advanced one position. The maximum time that counter 32 is capable of indicating is 59.9 minutes. When this condition is reached and another pulse is applied to wheel 32a, the circuitry will cause an advance of wheel 32a in counter 33. The wheel 33a will be pulsed once every 60 minutes and when it has received 10 pulses (10 hours) it will cause column 5, which is wheel 33b, to advance one position. The maximum time that may be shown is 23599, or 23 hours, 59.9 minutes.

Relays K–1, K–2 and K–3 control the reset solenoids and the carry pulse functions for counters 32 and 33. Whenever counter 32 registers 59.9 minutes and receives one more pulse it shifts to 60.0 minutes. When the 10's of minutes wheel moves to 6 relay K–3 is energized. As soon as relay K–3 is energized the minutes counter 32 is reset to zero through contact $aK$–3. At the same time through contact $bK$–3 power is applied to the hours counter 33. This advances the units of hours wheel one position and provides the carry from 60 minutes to 1 hour. Relay K–2 is energized whenever the units of hours wheel 33a is in position 3. Relay K–1 is energized whenever the 10's of hours wheel 33b is in position 2. Thus, when the hours in counter 33 are at 23, both relays K–1 and K–2 are energized. In this condition the next time that relay K–3 energizes, that is, at 23 hours 60 minutes, power is applied through contacts $aK$–1, $aK$–2 and $cK$–3 to the reset coil of the hours counter, thus returning it to 0. At this point both hours and minutes counters have returned to 0 and the cycle begins again.

Scanner 24 includes a stepping switch having three decks, which are indicated by the numerals 24a, 24b and 24c, respectively, in the figures. The stepping switch magnet is indicated by the numeral 24" and is pulsed each time the contacts $aK22$ of relay K22 are closed under the influence of pulses from the dual pulse generator 26. Stepping switches are well known in the art and the movable contacts of decks 24a, 24b and 24c are mechanically connected or "ganged" to rotate together. Rotation of the movable contacts is accomplished in discrete movements or steps under the control of magnet 24"—each pulse (or energization) received by the magnet resulting in the movement of the movable contacts one step—or from one stationary contact to the next.

Thus it is seen from the explanation of the device thus far given, that the pulses generated by pulse generator 20 are stored in clock 21 and are capable of being scanned by scanner 24 which can effect the punch solenoids.

Dual pulse generator 26 supplies pulses to the punch solenoids 27 and to space solenoid 28.

Pulse generator 26 is shown in detail in FIGS. 10 and 11 and consists of synchronous motor 35, bearings 36, gears 37, permanent magnets 38 and glass enclosed magnetic read switches 39. The timing motor 35 rotates the permanent magnets which in turn cause the read switches to make and break. The length of pulse generated is the length of time that the magnetic read switch is closed which is dependent upon the speed of the synchronous motor 35 and the distance separating the magnet 38 and the switch 39. Thus the pulses from the switches need not be the same length and the timing may be controlled by the relative positions of the magnets which are fixed to the gears. Fine adjustments may be made by changing the mesh of the gears.

The dual pulse generator shown in FIGS. 10 and 11 is by way of example only of course and other dual pulse generators may be used for the purpose of supplying punch and space pulses. It is noted that in the design shown in FIGS. 10 and 11 the pulses can be adjusted with respect to each other and independently which is an important aspect since timing is important with respect to the relation between spacing and punching.

Figure 14:
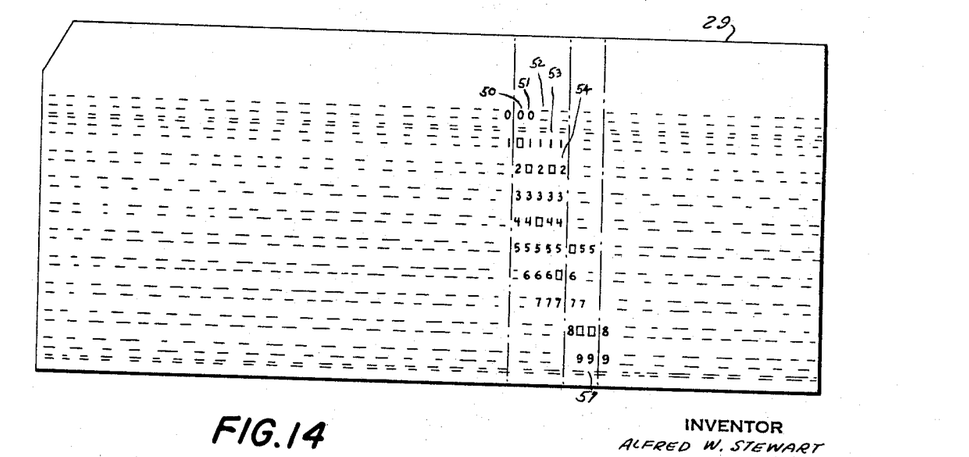
FIG. 14 is a face view of a typical tabulating card of the type used in the device described herein.

In order to consider the function of connect command means 22 and disconnect command means 23 attention is directed to FIG. 14 wherein a typical card is illustrated having 80 consecutive transverse columns, each of which has fields positions from 0 to 9.

For purposes of illustration, an arbitrary time of 12 hours, 42 minutes and 9/10 of a minute is assumed. This is in reality 42 minutes and 9/10 past the hour of 12 noon. This is the in-time when the card is in position and the connect or in-switch is made, this time is punched onto the card in columns 50 through 54 as illustrated in FIG. 14 wherein there is illustrated a typical card having 80 consecutive transverse columns, each of which has positions from 0 to 9. When the card is reinserted and positioned and the disconnect or the out button is made, then the time at that instance will be punched in columns 55 through 57. Again, for purposes of illustration, a disconnect time of 12 hours, 58.8 minutes has been chosen. Ordinarily the hours in the disconnect or out time will not be punched, however, the equipment could be arranged to punch the hours as well as the minutes in the disconnect time. Therefore, on card 29 in FIG. 14 in the out field or in columns 55, 56 and 57, a coded time of 58.8 is punched. The elapsed or difference in time, therefore, is 16 and 2/10 minutes. In order that the out or disconnect time is punched in the correct card field or position, the circuit is so arranged that when the disconnect switch is made, the card automatically advances 5 columns from column 50 to column 55 before punching begins.

Figure 3:
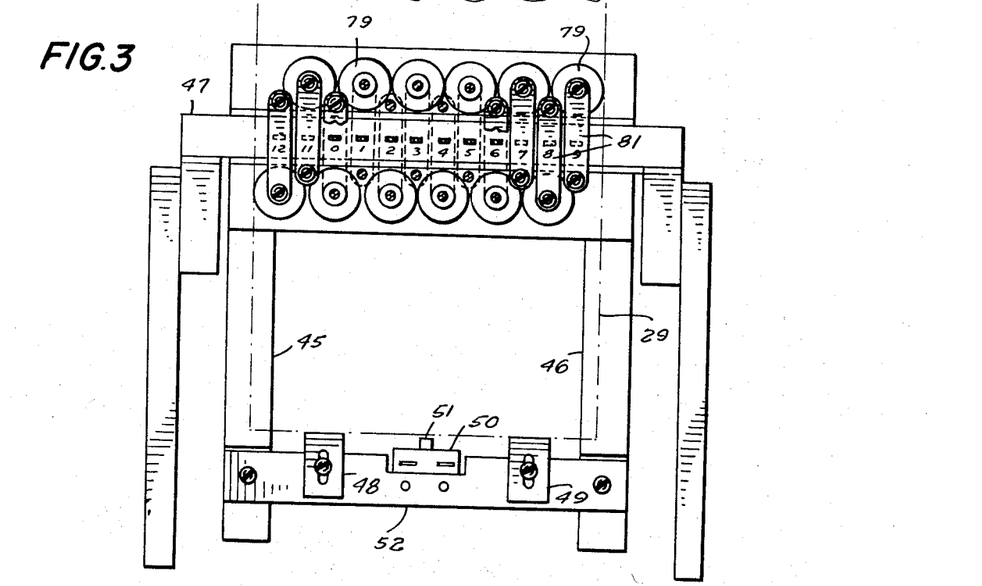
FIG. 3 is a segmentary view from beneath of the section of the device shown in FIG. 2 with certain of the parts seen in FIG. 2 removed therefrom.
Figure 4:
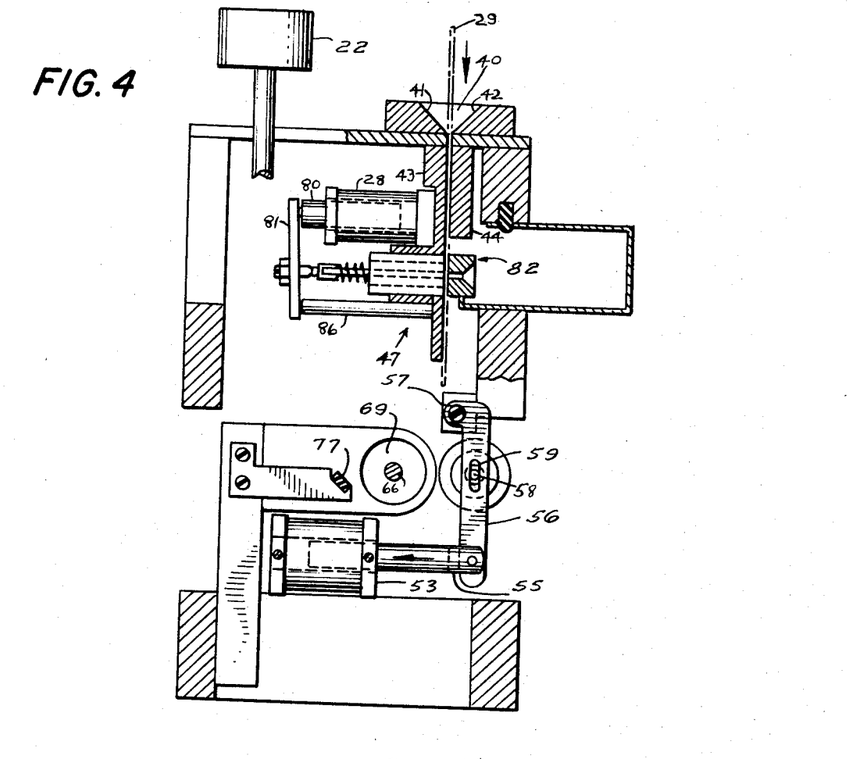
FIG. 4 is a sectional view taken along the line 4—4 in the direction of the arrows as shown in FIG. 2.
Figure 5:
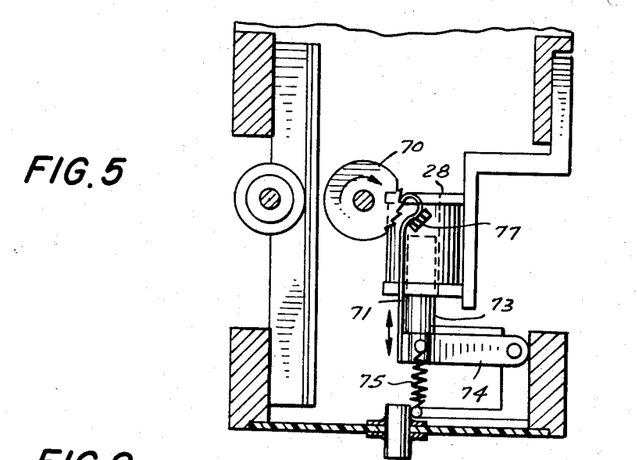
FIG. 5 is a partially sectional view taken along the line 5—5 in the direction of the arrows as shown in FIG. 2, illustrating details of the card transporting mechanism.
Figure 6:
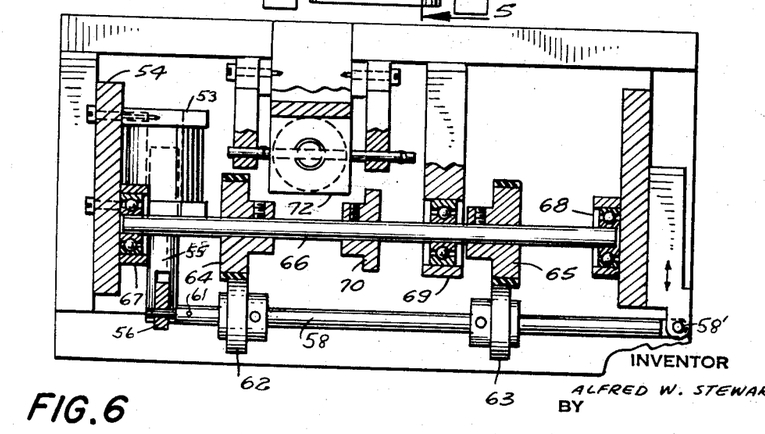
FIG. 6 is a sectional view taken along the line 6—6 in the direction of the arrows as shown in FIG. 2.

In FIG. 3, 12 punch solenoids and punches are shown. Punches 0 through 9 are numbered and positioned to correspond with rows 0 through 9 on the punched card. There are shown in FIG. 3 two extra punches and punch solenoids which are not used in this description but which could be used for special coding purposes such as punching the hours in one column instead of two in order to conserve space on the card or for any other coding that might be desired, for example, one of the punches could indicate an in-punch and the other an out-punch if punched along with each time recording.

Attention is now directed to FIGS. 2–9 wherein the mechanical aspects of the card handling section of the device are shown. Throat 40 is provided with lips 41 and 42 and is formed to receive a tabulating card such as card 29 which is inserted manually and which is guided by the upper card guides 43 and 44 and the lower card guides 45 and 46 to pass through punch station 47 so that the end of card 29 will contact card stops 48 and 49, the positions of which are adjustable. Card switch 50 is positioned so that the edge of card 29 can impact plunger 51 so that the switch contacts of card switch 50 will be actuated at the instant the card is stopped upon encountering stops 48 and 49. In the particular embodiment disclosed herein, stops 48 and 49 have been positioned so that the center line of punch station 47 is coincident with column 50 on tabulating card 29. The card stops can be repositioned through utilization of card stop support bar 52 or by adjustment of the card stops 48 and 49 themselves so that card 29 can be stopped on any column at which instant plunger 51 would be actuated. The card guides are set so that tabulating card 29 will be in registration with the punch station 47 in a transverse direction throughout its travel and upon encountering stops 48 and 49.

Clutch solenoid 53 is mounted to the frame member 54 and is energized when card switch 50 is actuated. The clutch solenoid is designed so that upon energization plunger 55 will move in the direction of the arrow indicated in FIG. 4 and cause arm 56 to pivot about its pivot point 57. An extension of shaft 58 is held captive within slot 59 in arm 56. Shaft 58 can be rotated about its pivot 58' until adjustable setscrew 61 strikes card guide 45. Upon this occurrence the shaft movement will be arrested at which position the clearance between ball bearings 62 and 63 and drive wheels 64 and 65 is slightly less than the thickness of a typical tabulating card, such as card 29. There is only enough mechanical resistance to permit a card between the ball bearings and drive wheels to maintain its position in spite of reversed thrust of the spring loaded switch plunger 51.

Hence a card can be inserted through throat 40 and moved into a position where its edges are encountering stops 48 and 49 and a selected column is in punch position 47. At this position the clutch solenoid 53 is energized by switch 50 causing the clearance between ball bearings 62, 63 and drive wheels 64 and 65 to be decreased to firmly grasp the card to clamp it in place, provided however, the connect or disconnect switch 22 or 23 is also closed as seen in FIG. 12. The peripheral circumference of each of the drive wheels 64 and 65 is coated with a non-marring rubber with a hardness of 75 to 80 durometer Shore A. When the clutch solenoid 53 is energized and the distance between the ball bearings and the drive wheels is brought to a predetermined value clamping the card in position, the card can be spaced.

The drive wheel shaft 66 is supported at either end by ball bearings 67 and 68 and can rotate in one direction only through the action of a uni-directional clutch 69.

The drive wheel shaft 66 is rotated about its axis by the mechanism during spacing at such increments that the total travel of the surface of each of the drive wheels is the equivalent of exactly one space on the tabulating card. The outside diameter of the drive wheel is exactly 0.997 inch and if the shaft is turned exactly 1/36 of a revolution through ratchet 70 which is fixed to the shaft the resultant travel of any point on the outside diameter of the drive wheel can be calculated to be 0.087 inch. Since no slippage can be encountered between the drive wheel and the tabulating card, this travel can be transferred to the card in a linear fashion.

Ratchet 70 is driven by means of shaped spring 71 (FIG. 8) which engages the ratchet teeth. When space solenoid 28 is energized, plunger 73 moves the pivot mechanism 74 a distance equal to the plunger travel so that the shaped spring is disengaged from the ratchet. Since the flat portion of spring 71 has been pre-loaded in the direction of the ratchet, the hook portion can engage the ratchet one tooth beyond.

De-energization of the solenoid results in springs 75 and 76 pivoting hinge mechanism 74 so that the shaped spring can return to its original position which is controlled by stop 77 and the ratchet is rotated one increment or 1/36 of a circle.

As stated previously, the spacing signal is developed by the dual pulse generator 26 which also develops a punch pulse for the accomplishment of punching at punch station 47.

Figure 7:
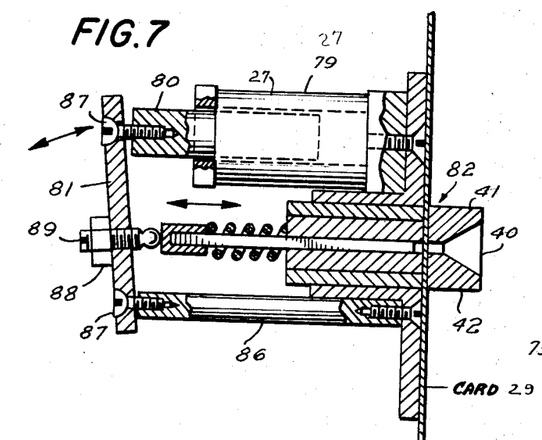
FIG. 7 is a partially sectional segmentary view of the punch station.
Figure 8:
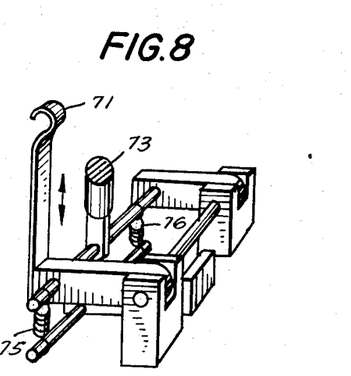
FIG. 8 is a perspective view of certain parts of the card transporting mechanism shown in FIG. 5.
Figure 9:
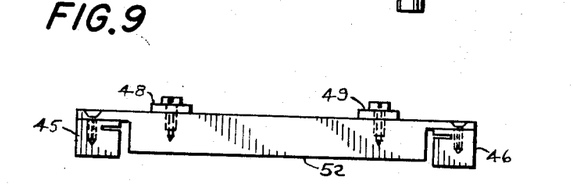
FIG. 9 is a segmentary view of the rear card guides and stop.

When a punch solenoid coil 27 is energized upon pushing of the connect or disconnect switch its plunger 80 is caused to travel in the direction of the arrow indicated in FIG. 7 and due to the action of linkage 81 the punch is driven in the same direction through the card and then into the die 82. The remaining end of linkage 81 is anchored to post 86 and a screw with a spherical radius head 87 is used to connect the linkage to the plunger 80 and the post. This spherical screw head which seats in a spherical countersink in the linkage 81 precludes binding of the linkage during movement of plunger 80. When the solenoid coil 27 is de-energized the mechanism returns to its original position through the punch return spring 87. Set screw 89 is used to set the position of the punch and is locked in place by nut 88.

The operation of the device will now be reviewed. At the start of the cycle all relays are deenergized and the pulse generator 20 is energized providing pulses to the storage portion of clock 21. AC power is also being supplied to the dual pulse generator 26 and plus 110 volts DC and minus 110 volts DC is being supplied to the unit. The stepping switch 24 is in the "home" or zero position. Tabulating card 29 is inserted manually through throat 40 and guided through the punch station and the end of the card strikes the end stops. At the same instant card switch 50 is actuated, and plus DC power is supplied to relay K24. The card has passed between shaft 66 carrying drive wheels 64 and 65 and shaft 58 carrying ball bearings 62 and 63. Upon the closing of connect switch 22 relays K–6 and K18 energize through the card switch 50 and the normally open contact $aK18$ of the connect switch and both latch through the holding contacts $aK18$ of relay K18 which is fed through the normally closed contacts $aK21$ of relay K21.

The clutch solenoid 53 energizes through the normally open contacts $bK16$ of relay K16 pivoting shaft 58 and clamping card 29 in position.

Power is applied to all counter sensing relays K4 through K15 and the normally open contacts $cK16$ of relay $eK16$. Relay K24 energizes through the normally open contacts of relay $dK16$ and power is applied to the common of the stepping switch through the normally open contacts $bK18$ of relay K18. Power to the common of the stepping switch deck 24c is applied through the normally open contacts $bK24$ of relay K24 and the dual pulse generator is energized through the same normally open contacts of K24 and normally closed contacts $bK20$ of relay K20.

The first "space" pulse from dual pulse generator 26 energizes relay K22 closing normally open contacts $aK22$ and $bK22$ and thereby energizing stepping switch magnet and space solenoid 28. At the termination of this space pulse relay K22 deenergizes and the stepping switch magnet deenergizes which moves the stepping switch one position. The space solenoid deenergizes which moves card 29 one column.

When deck 24a of the stepping switch reaches position "one," a circuit is completed to the tens of hours wheel of counter 33 through normally opened contacts $bK18$ of relay K18 and energizing the relay corresponding to the position of this counter wheel. At the same time relay K21 is deenergized and relay K20 is energized.

The "punch" pulse from the dual pulse generator which follows then energizes punch relay K23 through contacts $bK20$ and $cK16$ and $bK24$ energizing appropriate punch solenoids ($s$–1 through $s$–12) through the contacts of whichever counter sense relay that may be energized.

Space and punch pulses are continually alternately received repeating the above until all counters have been scanned in five successive positions of each deck indicated in the figures as $l$, $m$, $n$, $o$, and $p$. Blank positions of the switch are "stepped by" until the switch returns to "home" position. On arrival of the stepping switch at "home" position relay K21 energizes through deck 24c of the stepping switch and normally open contacts $cK20$ of relay K20.

When relay K21 is energized the latching circuits for relays K16, K18 and K20 are interrupted and each of these relays is deenergized.

When relay K16 is deenergized, relay K24 is deenergized since $dK16$ opens and contacts $bK24$ open interrupting power to deck $24c$ of the stepping switch thus deenergizing relay K21, and removing power from the Dual Pulse Generator to interrupt the "space-punch" pulses. All components have at this time returned to their original condition and the "connect" cycle is complete.

The card 29 can be removed if it is desired.

The disconnect cycle is the same as the "connect" cycle except relay K17 is energized instead of relay K18. The card can be reinserted for the disconnect cycle. This then energizes deck $24b$ of the stepping switch instead of deck $24a$.

On deck $24b$, the first 5 positions are blank, but the stepping switch scans the minutes and tenths of minutes counter wheels $32a$, $32b$ and $32c$ in positions $q$, $r$ and $s$, and is then returned to the "home" position. This stepping is accomplished in the manner explained above.

In order to provide for the situation where a time pulse is generated during either "connect" or "disconnect" cycles the clock counter is inhibited in view of the fact that the normally closed contact $cK16$ of relay K16 interrupts —DC to the counter solenoids. Instead, the time pulse energizes relay K19 through contact $aK16$ and relay K19 latches in through $aK17$ or $aK18$ and $aK21$. At the end of the "connect" or disconnect" cycle, as relay K21 energizes and then deenergizes, a pulse is sent through $bK21$ and $bK19$ to the clock counter thus replacing the time pulse lost.

Thus, among others, the several objects of the invention as specifically aforenoted, are achieved. Obviously, numerous rearrangement of parts and substitutions can be made without departing from the spirit of the invention as defined by the claims.

I claim:

1. A device for storing information and recording said information on an information storage element including in combination a housing, an entrance to said housing for said information storage element, recording means, guide means for directing said information storage element to present a zone thereof into operable relationship with said recording means, clutch means for engaging said information storage element, clutch means actuating means for actuating said clutch means, said clutch means actuating means being responsive to said information storage element in predetermined position thereof, spacing means for moving said information storage element to present a different zone thereof to said recording means, electronic control means for selectively controlling said spacing means, and recording means actuating means for actuating said recording means to record information on said storage element at said different zone.

2. A device in accordance with claim 1 in which said recording means consists of a plurality of indicia recording devices and means for separately actuating each of said devices.

3. A device in accordance with claim 1 in which said information storage element is a tabulating card and said recording means consists of a plurality of card punches and associated solenoids and means for separately energizing each of said solenoids.

4. A device in accordance with claim 1 in which said clutch means actuating means is movable within said housing to a plurality of positions to provide for actuation of said clutch means in a plurality of positions of said information storage element whereby a plurality of zones of said storage element can be presented in operable relationship with said recording means.

5. A device in accordance with claim 3 in which each punch of said plurality is spring pressed to a nonpunching position and is positively driven to a punching position upon energization of its respective associated solenoid by a punch driving assembly which includes a solenoid plunger, a post, said punch being between said plunger and said post, an arm, first and second spherical recesses in said arm, a first screw with a spherical head within said first recess joining an end of said arm to said post, a second screw with a spherical head within said second recess joining the remaining end of said arm to said plunger and drive means of said arm engaging said punch whereby upon actuation of said solenoid said drive means will push said punch.

6. A device in accordance with claim 5 in which said drive means is a member projecting from said arm with a spherical head against which the end of said plunger is yieldingly spring pressed and the distance at which said member projects can be varied.

7. A device in accordance with claim 1 in which said spacing means is actuated by said recording means actuating means to move said information storage element in timed relation to recording on said information storage element.

8. A device in accordance with claim 1 in which said information storage element is a tabulating card and said clutch means consists of a drive shaft, drive wheels on said drive shaft, an idler shaft, idler wheels on said idler shaft, an idler shaft pivot connect at one end thereof, a solenoid plunger engaging the remaining end of said idler shaft and a clutch solenoid and said clutch means actuating means is a switch for energizing said clutch solenoid whereby said idler shaft is pivoted toward said drive shaft and said drive wheels and said idler wheels engage said tabulating card.

9. A device in accordance with claim 8 in which said idler shaft and said drive shaft are adjacent to and disposed above and below said entrance to said housing and a stop member is provided to prevent further pivoting of the idler shaft under the influence of said clutch solenoid when the distance between said drive wheels and said idler wheels is slightly less than the depth of said tabulating card and the circumference of said drive wheels is covered with resilient material.

10. A device in accordance with claim 8 in which said spacing means consists of a space solenoid plunger, a space solenoid and linkage means between said space solenoid plunger and said drive shaft for rotating said drive shaft upon energization of said space solenoid.

11. A device in accordance with claim 10 in which said linkage means consists of a ratchet on said drive shaft and a pawl moved by said space solenoid plunger, and said pawl and ratchet being constructed and arranged to rotate said drive shaft to move said tabulating card a distance equal to one hole spacing for each energization of said space solenoid.

12. A device for storing information and recording said information on an information storage element including in combination first pulse generating means, storage means for storing pulses from said first pulse generating means, second pulse generating means, first and second alternate pulses repeatedly generated by said second pulse generating means, a housing, an entrance to said housing for said information storage element, a plurality of recording means, guide means for directing said information storage element into operable relationship with said plurality of recording means, spacing means for moving said information storage element to present a different zone thereof to said plurality of recording means, start means for actuating said first pulse generating means, switch means for actuating said second pulse generating means, scanning means scanning said storage means, selected recording means of said plurality conditioned by said scanning means in accordance with pulses stored in said storage means, said first pulse actuating said selected recording means and second pulse actuating said spacing means.

13. A device in accordance with claim 12 in which said second generating means includes a motor, first and second spaced magnets rotated by said motor, first and second glass enclosed reed switches adjacent to and in the magnetic field of said respective first and second magnets.

14. A device in accordance with claim 12 in which said storage means includes means for receiving sequential pulses from said first pulse generating means and units for storing said pulses as real time.

15. A device in accordance with claim 12 in which each recording means of said plurality has an individual solenoid associated therewith which can be energized by a first pulse when conditioned by said scanning means.

References Cited

UNITED STATES PATENTS

| | | | |
|---|---|---|---|
| 141,775 | 8/1873 | Edison | 234—108 |
| 2,838,361 | 6/1958 | Findlay et el. | 346—83 |
| 2,971,811 | 2/1961 | Findlay et al. | 346—86 |
| 2,981,586 | 4/1961 | Kawachi | 346—83 X |

WILLIAM S. LAWSON, *Primary Examiner.*